April 18, 1950   W. E. LAWSON, JR   2,504,541
SOUNDING DRINKING RECEPTACLE FOR CHILDREN
Filed Jan. 29, 1946
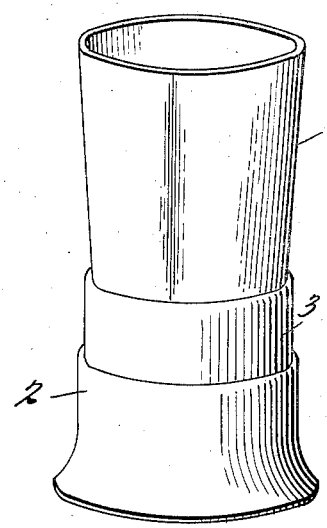
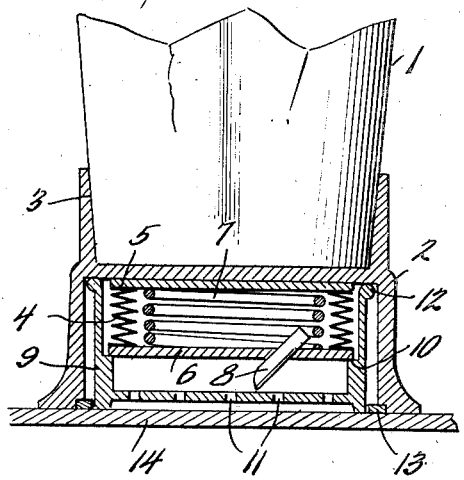
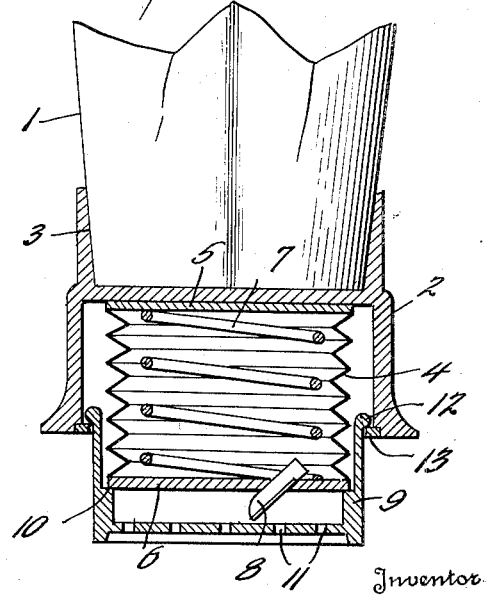
Inventor
William E. Lawson, Jr.,
By Howard R. Eccleston
Attorney Patented Apr. 18, 1950

2,504,541

UNITED STATES PATENT OFFICE 2,504,541

SOUNDING DRINKING RECEPTACLE FOR CHILDREN

William E. Lawson, Jr., Rahway, N. J.

Application January 29, 1946, Serial No. 644,067

7 Claims. (Cl. 46—175)

A sufficient quantity of milk is most important in the diet of young children, as is well known, but it is also well known that in a great many cases there is great difficulty, day after day, in trying to make the children drink sufficient milk.

In most cases the children are offered inducements to drink the milk and this goes on meal after meal and day after day and without any real training of the child so that it will naturally form the habit of wanting to drink milk.

The object of the present invention is to provide a device in which the child will be interested, and by which it will be amused, while drinking milk or other liquids, so that it will form the habit of looking forward to this particular amusement while drinking the milk, and thus form the very desirable, and often most difficult, milk drinking habit.

More specifically, the object of the invention is to provide the novel combination of a drinking receptacle and a sound producing device, so constructed and arranged that when the receptacle is raised for drinking the milk a sound, preferably that simulating the moo of a cow, will be produced. The child, wanting to hear the cow's moo, is anxious to repeatedly lift the glass and take a drink. And, as mentioned above, the child soon looks forward to this amusement at each meal, and thereby forms the milk drinking habit.

A preferred embodiment of the invention will now be described, reference being had to the accompanying drawings, in which:

Figure 1 is a perspective view of the device;

Figure 2 is a vertical sectional view of the device when resting on a table or other support, the drinking receptacle being in elevation and broken away; and Figure 3 is a similar view with the device lifted for drinking.

Referring to the drawings in more detail, the drinking receptacle, indicated by numeral 1, is in the form of a tumbler or cup, and is preferably formed of plastic material, though it may be formed of any other suitable material such as glass or metal. The words tumbler or glass as used hereinafter or in the claims, are intended to include cups.

Numeral 2 refers generally to the base of the device which may also be of any suitable material. The cup and base are preferably separable for purposes of cleaning and filling. In the preferred construction the base is provided in its upper portion with a tapered seat 3 to receive the correspondingly tapered cup or glass 1. This tapered contact between the glass and the base will hold the parts together when the glass is grasped and raised by the child.

The lower portion of the base 2, beneath the above-mentioned seat, is hollow and provides a housing for the voice or sound producing device. This includes the usual bellows 4 having a top disc 5, which rests against the bottom of the cup seat as shown in Figures 2 and 3, and a bottom disc 6.

Arranged within the bellows is a coil spring 7 to extend the bellows and the bottom disc carries the usual voice tube 8, the reed of which is vibrated when air is sucked in by the extension of the bellows.

Numeral 9 indicates a voice chamber member which is telescopically arranged in the hollow base and which surrounds the bellows. At a point above the bottom of this chamber member there is provided a shoulder 10 upon which rests the bottom bellows disc 6. This shoulder is at a sufficient distance above the bottom of the chamber member to provide space for the voice tube 8. The bottom of the chamber member is preferably provided with openings 11.

At its upper end the chamber member is provided with an outwardly extending bead or flange 12 which, in cooperation with a retaining ring 13 cemented or otherwise secured to the bottom of the base, prevents the chamber member from being detached from the base and limits its outward movement.

Only a very brief description of the operation of the device will be necessary. In Figure 2 the device is shown as resting on a table, tray, or the like, indicated by numeral 14. When in this position the weight of the glass, its contents, and the base, holds the bellows collapsed and the chamber member telescopically housed within the base.

In drinking, the child may grasp either the glass or the base, it makes no difference for the parts are held together frictionally. The position of the parts when drinking are shown in Figure 3. The child lifts the device from the support 14 of Figure 2 to take a drink and the coil spring 7 thereupon extends the bellows together with the chamber member 9. This extension of the bellows causes air to be sucked in through the voice tube 8 vibrating the reed and producing a sound simulating the moo of a cow, or other desired sound, which sound escapes through the openings 11.

When the child replaces the device on the support the weight causes the parts to collapse to the positions shown in Figure 2, the air in the bellows escaping through the voice tube 8 but not causing the vibration of the reed.

The operation could be reversed, so that the sound would be produced when the drinking receptacle is seated, if that should be desired.

From the foregoing description it will be apparent that I have devised a very simple and inexpensive drinking receptacle for children which will interest and amuse them and help them to form the very desirable milk drinking habit. While I have described in considerable detail the preferred embodiment of the device, it will be understood that the invention is in no manner limited to the specific construction shown and described for obviously many changes and modifications are possible, and all such changes and modifications are intended to be included within the scope of the appended claims.

What I claim is:

1. A drinking receptacle for children, including the combination of a drinking tumbler having a base, and air operated sounding means carried by said base, said means including means for creating air flow to operate said sounding means by relative vertical movement between the base and the surface upon which it is supported.

2. A drinking receptacle for children, including the combination of a base and a drinking tumbler, the tumbler being separably but securely attached to the base in upright position, air operated sounding means carried by said base, said means including means for creating air flow to operate said sounding means by relative vertical movement between the base and the surface upon which it is supported.

3. A drinking receptacle for children, including the combination of a base and a drinking tumbler for milk or other liquid, the tumbler being separably but securely attached to the base in an upright position, air operated sounding means carried by said base for producing a sound simulating the moo of a cow, said means including means for creating air flow to operate said sounding means by relative vertical movement between the base and the surface upon which it is supported.

4. A drinking receptacle for children, including the combination of a base and a drinking tumbler, the tumbler being separably but securely attached to the base in an upright position, an air actuated voice tube and a bellows carried by said base, and a coil spring for extending the bellows, the bellows and coil spring held in compressed condition by the weight of the combination when rested base down upon a surface, the extension of the bellows, upon relative vertical movement between the base and the surface upon which it is supported, causing the production of a desirable sound by the voice tube.

5. A base for drinking tumblers for children, means provided in the upper portion of said base for securing a drinking tumbler thereto, the lower portion of said base being hollow, and a device to produce sound by air housed therein, said device including a sounder and means for creating air flow, said last named means being movable outwardly beyond the bottom of the base upon relative separating movement between the base and the surface upon which it is supported, said outward movement causing the flow of air through the sounder.

6. A base for drinking tumblers for children, means provided in the upper portion of the base for securing a drinking tumbler thereto, the lower portion of the base being hollow, an air actuated voice tube and a bellows mounted therein, a coil spring for extending the bellows, the coil spring and bellows held in compressed condition by the pressure of the weight thereon when the base is rested bottom down on a surface, the extension of the bellows when the base is lifted from its supporting surface causing the production of a desirable sound by the voice tube.

7. A base for drinking tumblers for children, means provided in the upper portion of the base for securing a drinking tumbler thereto, air operated sounding means carried by said base, said means including means for creating air flow to operate said sounding means by relative vertical movement between the base and the surface upon which it is supported.

WILLIAM E. LAWSON, Jr.

REFERENCES CITED

The following references are of record in the file of this patent:

UNITED STATES PATENTS

| Number | Name | Date |
| --- | --- | --- |
| 352,051 | Fulda | Nov. 2, 1886 |
| 367,642 | Lane | Aug. 2, 1887 |
| 1,739,451 | Fowler | Dec. 10, 1929 |
| 1,772,394 | Hanselmann | Aug. 5, 1930 |
| 2,116,183 | Beach | May 3, 1938 |
| 2,177,337 | Stein | Oct. 24, 1939 |